United States Patent [19]

Riegler et al.

[11] 4,070,009
[45] Jan. 24, 1978

[54] TILTABLE METALLURGICAL VESSEL ARRANGEMENT

[75] Inventors: Ernst Riegler, Enns; Manfred Schmidt, Linz, both of Austria

[73] Assignee: Vereinigte Osterreichische Eisen- und Stahlwerke - Alpine Montan Aktiengesellschaft, Linz, Austria

[21] Appl. No.: 764,210

[22] Filed: Jan. 31, 1977

[30] Foreign Application Priority Data
Feb. 3, 1976 Austria .................................. 728/76

[51] Int. Cl.² ............................................. C21C 5/46
[52] U.S. Cl. ....................................... 266/99; 266/245
[58] Field of Search ................. 75/59, 60; 266/91, 99, 266/243, 245, 246, 247; 308/3 R, 3 A, 31, 73

[56] References Cited
U.S. PATENT DOCUMENTS

| 3,773,497 | 11/1973 | Grenfell et al. | 75/60 |
| 4,023,785 | 5/1977 | Riegler et al. | 266/245 |

Primary Examiner—Gerald A. Dost
Attorney, Agent, or Firm—Brumbaugh, Graves, Donohue & Raymond

[57] ABSTRACT

A tiltable metallurgical vessel arrangement, in particular a steel making plant converter, has carrying trunnions arranged in bearings, one of the bearings being a fixed bearing and one being an expansion bearing, and bearing housings for the bearings; the bearing housings have supporting faces which rest on counter-supporting faces of a base-supported supporting construction; at least one of the bearing housings has two supporting faces arranged at a distance from each other and a strain measuring means connected to the bearing housing between the supporting faces thereof to indicate a sagging of said bearing housing under load.

4 Claims, 2 Drawing Figures

TILTABLE METALLURGICAL VESSEL ARRANGEMENT

The invention relates to a tiltable metallurgical vessel, in particular a converter in a steel making plant, having a fixed bearing and an expansion bearing for the carrying trunnions, wherein the bearing housings are provided with supporting faces resting on counter supporting faces of a supporting construction mounted on the base.

In newly developed methods of metal production, in particular in steel making methods, weight changes of the material being charged are used for controlling the production process. For monitoring the process, curves are plotted showing the changes in the weight of the bath. From the path of the curves one can draw conclusions on the carbon content of the melt, on the temperature of the bath, as well as on the tendency towards slopping. Thus, during a heat, a precise weighing of the materials charged and the fluxing agents is of great importance.

For carrying out such a weighing it has been known to mount the bearing housings directly or via bridges on force measuring means. It is a pre-requisite for an exact weighing that only vertical forces act on the force measuring means, since transverse forces falsify the measuring result or make it inaccurate. For this reason care must be taken that the transverse forces are accommodated by separate construction elements, such as roller guides or tension members acting in horizontal direction.

These metallurgical vessels equipped with force measuring means have a complicated structure. Equipping common metallurgical converter plants with force measuring means causes high costs and, in addition, extended periods of standstill.

The invention aims at avoiding these disadvantages and difficulties and has as its object to provide a tiltable metallurgical vessel, in particular a converter in a steel making plant, with a weighing means which does not require any additional construcrion elements for keeping off transversal forces occuring and which makes it possible to equip already existing converters with weighing means without a costly and time-consuming re-construction.

According to the invention, these objects are achieved in that the bearing housing of the fixed bearing and/or of the expansion bearing is each supported on two supporting faces arranged at a distance from each other, wherein a strain measuring means is connected with the housing part between the supporting faces which shows a sagging of this housing part under the influence of a load.

Advantageously, the suppoting faces are arranged symmetrically to the vertical plane laid through the carrying trunnion axis.

According to a preferred embodiment, a recess is provided in the supporting construction between the supporting faces and the counter supporting faces, wherein the strain measuring means is arranged at the lower side of the housing part covering the recess.

Therein, advantageously a strain gauge glued to the bearing housing is used as strain measuring means.

The invention shall now be described in more detail by way of an example and with reference to the accompanying drawings, wherein.

Figure 1:
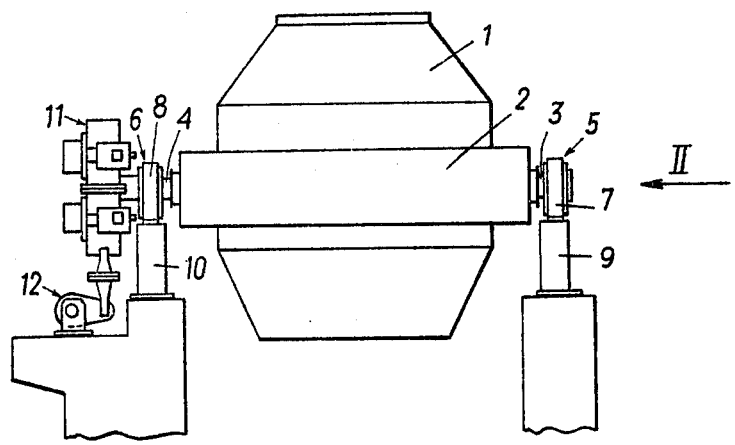
FIG. 1 shows a front view of the overall arrangement of a converter plant.

In FIG. 1, a converter of a steel making plant is denoted by 1, which converter is inserted into a carrying ring 2 having two carrying trunnions 3, 4. The carrying trunnions are mounted in an expansion bearing 5 and a fixed bearing 6, whose bearing housings 7, 8 each rest on a supporting construction comprised of a stand 9 and 10, respectively, stationarily connected with the base. The carrying trunnion 4 allocated to the fixed bearing is connected with a tilting drive 11 supported relative to the base via a torque support 12.

Figure 2:
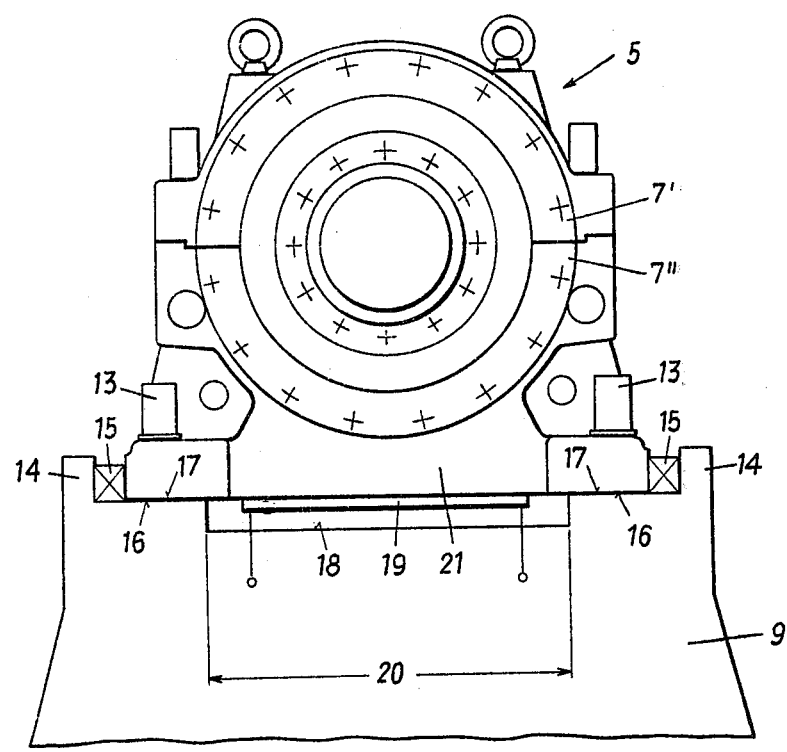
FIG. 2 is a view of a carrying trunnion bearing including a strain measuring means in the direction of the arrow II of FIG. 1 on an enlarged scale.

FIG. 2 illustrates the construction of the expansion bearing 5 and its strain measuring means. The fixed bearing and the strain measuring means allocated thereto is constructed in the same manner. The bearing housing 7 of the expansion bearing is assembled of a bearing housing upper part 7' and a bearing housing lower part 7''. The bearing housing lower part 7'' is secured to the stand 9 by screws 13. The stand 9 is provided with upwardly projecting noses 14 lateral of the bearing housing lower part 7'', the bearing housing lower part being supported against these noses via wedges 15. The bearing housing part rests in a bridge-like manner with its supporting faces 16 on counter supporting faces 17 arranged symmetrically to the vertical plane laid through the carrying trunnion axis at a distance 20 from each other. Between the supporting and counter supporting faces 16, 17, respectively, a recess 18 is provided in the stand 9. However, this recess can also be provided in the lower side of the bearing housing lower part. To part 21 of the bearing housing lower part 7'' there is glued a strain gauge 19 between the supporting faces 16 at the side facing the stand.

The strain applied to this housing part 21 by the carrying trunnion causes slight saggings of this part, whereby elongations occur on the lower side of the housing part 21, which constitute a measure of the vertical forces present and thus of the weight changes occuring during the process. The elongations are measured by the strain gauges and recorded by an indicator means not illustrated.

The housing part 21 between the supporting faces and the distance 20, respectively, between the supporting and counter supporting faces 16, 17 are so dimensioned that for the weight or weight changes to be determined an elongation or change in elongation that is sufficiently great and can be recorded occurs on the strain gauge.

In order to equip a common converter with the measuring means described, only the recess 18 need be made, which allows for a sagging of the housing part 21. Depending on the strength of the housing part 21, the recess can be provided in the stand or in the bearing housing lower part 7''.

What we claim is:

1. In a tiltable metallurgical vessel arrangement, in particular a converter to be used in a steel making plant, of the type including carrying trunnions for carrying the vessel and bearings accommodating the carrying trunnions, one of the bearings being a fixed bearing and one of the bearings being an expansion bearing, the bearings being arranged in bearing housings having supporting faces, and a base-supported supporting construction having counter supporting faces, the supporting faces resting on the counter supporting faces, the improvement which is characterized in that the bearing housing of at least one of the bearings has two supporting faces provided at a distance from each other, and that a strain measuring means is provided and connected to said bearing housing between the two supporting faces to indicate a sagging of said bearing housing between its two supporting faces under load.

2. A tiltable metallurgical vessel arrangement as set forth in claim 1, wherein said supporting faces are arranged to be symmetrical relative to a vertical plane laid through the axis of the pertaining carrying trunnion.

3. A tiltable metallurgical vessel arrangement as set forth in claim 1, wherein a recess is provided in the supporting construction between the counter supporting faces thereof, the strain measuring means being arranged at the lower side of said bearing housing between its two supporting faces where said bearing housing covers said recess.

4. A tiltable metallurgical vessel arrangement as set forth in claim 1, wherein said strain measuring means is a strain gauge glued to the respective bearing housing between the two supporting faces thereof.

* * * * *